June 11, 1963 H. M. SCHLICKE ETAL 3,093,803
FILTER HAVING LUMPED RESONANCE ELEMENTS SPACED ALONG LENGTH OF SHIELDING ENCLOSURE, WITH ADJUSTABLE MAGNETIC COUPLING BETWEEN ELEMENTS
Filed Aug. 19, 1959 2 Sheets-Sheet 1

INVENTORS
Heinz M. Schlicke
Hans J. Rey
Hans E. Weidmann
BY
Arthur H. Seidel
ATTORNEY INVENTORS
Heinz M. Schlicke
Hans J. Rey
Hans E. Weidmann
BY
Arthur H. Seidel
ATTORNEY United States Patent Office 3,093,803
Patented June 11, 1963

3,093,803

FILTER HAVING LUMPED RESONANCE ELEMENTS SPACED ALONG LENGTH OF SHIELDING ENCLOSURE, WITH ADJUSTABLE MAGNETIC COUPLING BETWEEN ELEMENTS

Heinz M. Schlicke, Fox Point, and Hans J. Rey and Hans E. Weidmann, Milwaukee, Wis., assignors to Allen-Bradley Company, Milwaukee, Wis., a corporation of Wisconsin Filed Aug. 19, 1959, Ser. No. 834,806
16 Claims. (Cl. 333—73)

Figure 1:
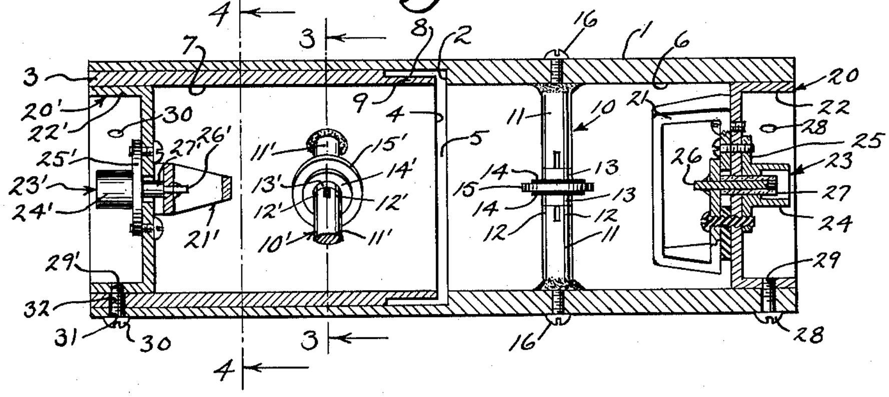

This invention relates to band pass filters suitable for use at very high and ultra high frequencies, and it more specifically resides in a filter having a field confining enclosure in which there is disposed a pair of magnetically coupled resonant circuit elements that have the magnetic field components of each encircling transverse axes to impart such a directional aspect to the fields that a relative rotation of the circuit elements will adjust the coupling therebetween.

With increasing use of communication systems employing multiple carrier channels operating with very high carrier frequencies the need of filtering and separating such carrier frequencies in apparatus handling large amounts of power has presented an acute problem. A common situation is the instance of having several transmitters feeding a common antenna, wherein a filter is required at the output of each transmitter to pass the particular transmitter frequency to the antenna and to block other frequencies from feeding back into the transmitter. The filter of the present invention is particularly intended for such a use, and particularly where conditions of ambient temperature and physical shock are extremely adverse. Further, the filter is capable of handling large amounts of power and fulfills a need in multiplex systems for telemetering and like applications.

A selective filter that passes only a narrow band of frequencies is provided by the apparatus hereinafter described. To achieve a narrow pass band a pair of tuned resonant circuit elements are magnetically coupled that individually present highly reactive charcteristics with low loss. These circuit elements are then loosely coupled, so that energy transfer through the apparatus is restricted to the resonant frequency and a narrow band to each side. In attaining these results a wave guiding enclosure houses the circuit elements and cooperates therewith to effect coupling within an adequately shielded confined space. Each circuit element is of a sturdy structure and receives direct physical support from the enclosure so as to withstand mechanical vibration as may, for example, be encountered under flight conditions. The circuit elements are of a form that the related magnetic fields encircle diametric axis of the enclosure, and by relative rotation the coupling between circuit elements can be adjusted and made quite loose. An antenna can be placed at each end of the enclosure for introducing and withdrawing RF energy. This structure achieves a number of objects, some of which may be listed as follows:

One object is to provide a filter of the character described which can handle large amounts of power at very high and ultra high frequencies.

Another object of the invention is to provide a narrow band pass filter for the higher radio frequency bands which is relatively easy to tune and adjust preparatory to use.

Another object of the invention is to provide a filter capable of transmitting large amounts of power at the higher radio frequency bands which is compact so as to conserve space in closely assembled apparatus.

Another object is to provide a filter that is rugged and sturdy to withstand severe mechanical vibrations without change in electrical characteristics.

It is another object of this invention to provide a filter for operation at very high frequencies which effectively and efficiently dissipates heat evolved therein.

It is another object of this invention to provide a narrow band pass filter which is stable under high ambient temperatures.

It is another object of this invention to provide a filter for use over a large frequency range through which large amounts of power may be transmitted.

It is another object of this invention to provide a narrow band pass filter having very steep slopes for the pass band of frequencies to which it is adjusted.

It is another object of this invention to provide a narrow band pas filter for operation at very high frequencies which introduces a very high insertion loss in a circuit except at the pass band frequencies.

It is another object of this invention to provide a narrow pass band filter for operation at very high frequencies having an extremely low insertion loss within the pass band.

The foregoing and other objects and advantages of this invention will appear from the description to follow, and in the description reference is made to the accompanying drawings which form a part hereof. The description and drawings illustrate by way of example and not of limitation specific forms in which the invention may be embodied.

Figure 2:
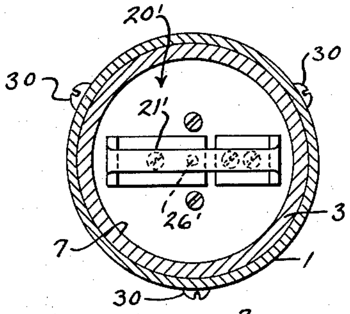
Figure 4:
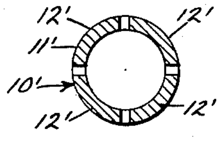
Figure 3:
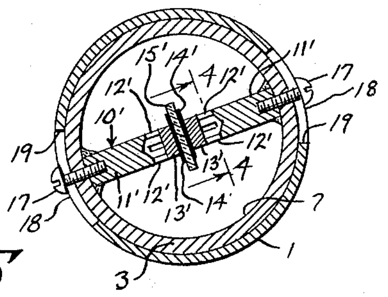
Figure 5:
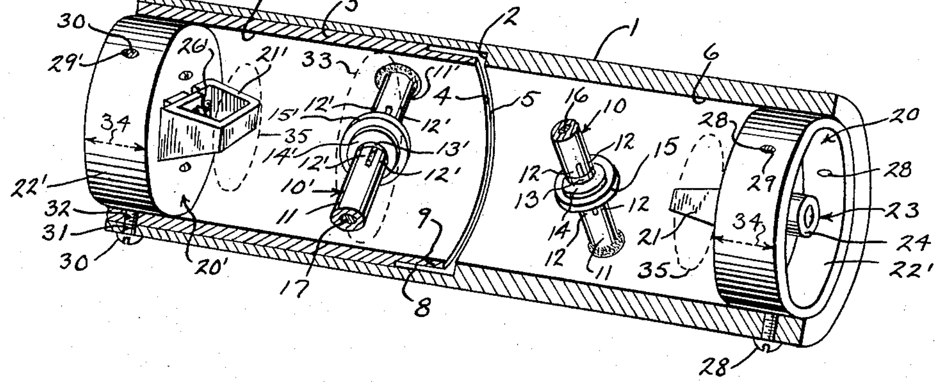
Figure 6:
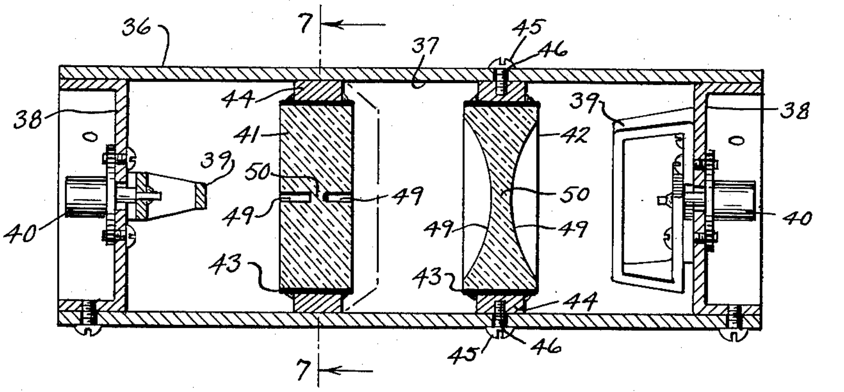
Figure 7:
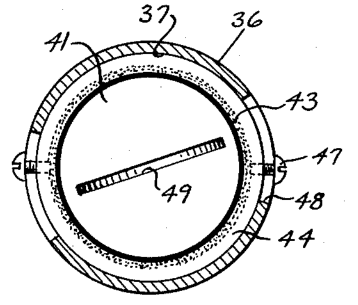
Figure 9:
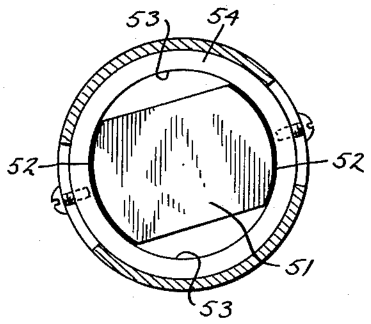
Figure 8:
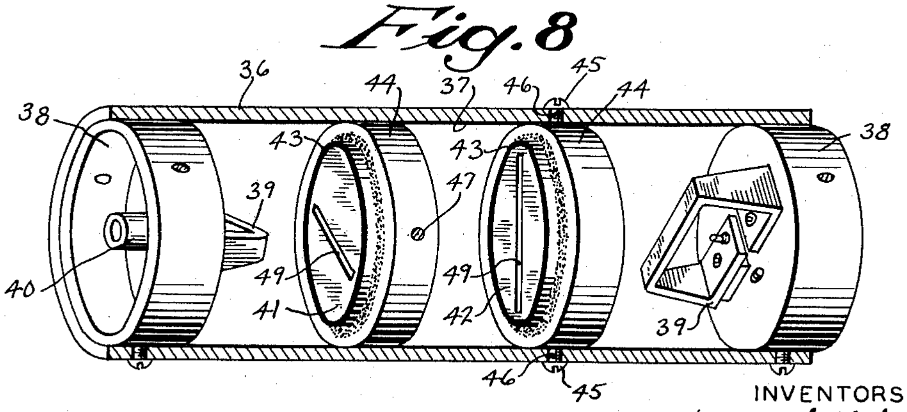

In the drawings:

FIG. 1 is a longitudinal view in cross section of a filter embodying the invention, FIG. 2 is a view in cross section of the filter of FIG. 1 taken on the plane 2—2, FIG. 3 is a view in cross section of the filter taken on plane 3—3 shown in FIG. 1, FIG. 4 is an enlarged view in cross section of a portion of the filter viewed through the plane 4—4 shown in FIG. 3, FIG. 5 is a schematic view in perspective of the filter of FIG. 1 with parts broken away and in section, FIG. 6 is a longitudinal view in cross section of another form of the invention, FIG. 7 is a view in cross section of the filter of FIG. 6 viewed through the plane 7—7, FIG. 8 is a schematic view in perspective of the filter of FIGS. 6 and 7 with portions broken away and in section, and FIG. 9 is a view in cross section of a filter showing an alternative form for a dielectric material that may be employed.

Referring now to the drawings and more specifically to FIGS. 1–5, there is shown therein a filter having a circular cylindrical wave guiding, or confining, enclosure 1 formed from a low resistance conductive metal. At about the mid-point of the longitudinal length of the enclosure 1 there is an internal circumferential step 2, such that the enclosure is of greater thickness to the right of the step 2 and of reduced thickness to the left of the step 2. Closely fitted within the left hand portion of the enclosure 1 is a circular cylindrical sleeve 3 that may be rotated with respect to the enclosure 1. The inner edge 4 of the sleeve 3 is spaced from the internal step 2 to leave a slot 5 that circumferentially divides the interior. The cylindrical surface 6 of the enclosure 1 is to the right of the slot 5 and a similar surface 7 forming a part of the sleeve 3 is to the left, as viewed in FIG. 1. The coaxial surfaces 6 and 7 are of like diameter and are preferably highly polished so that surface resistance to current flow is minimal. The preferred material for the surfaces 6 and 7 is a highly polished silver plate on a copper base material. The slot 5 is, as shown in FIGS. 1 and 5, of an L-shape which continues behind the edge 4 by virtue of a cut 8 taken in the outer surface of the sleeve 3. There is thus defined an overhanging lip 9 at the inner end of the sleeve 3, the purpose of which construction will be hereinafter discussed.

Within the enclosure 1 is a pair of diametrically extending conductive studs 10 and 10' which are alike in construction. Like reference numerals are applied to like parts of each of the studs 10, 10' with the parts of stud 10' being indicated by a prime mark. The stud 10 will be described in detail and it is seen that it extends diametrically across the interior of the enclosure 1 to join electrically with opposite sides of the surface 6. The stud 10' similarly extends diametrically across the interior of the sleeve 3 to form an electrical bridge between opposite sides of the surface 7.

The stud 10 is subdivided into two like halves which are designated by the numeral 11. The radially outer ends of the halves 11 have solder joints with the surface 6 to insure uninterrupted electrical conductivity for very high frequency currents. The inner ends of the stud halves 11 are drilled and slotted to form a set of four relatively flexible fingers 12. This construction is shown, for the stud 10', in FIGS. 3 and 4. The radially inner ends of the fingers 12 seat upon and are brazed to small steel shims 13, and the shims 13 in turn rest upon capacitor electrodes 14. The capacitor electrodes 14 are formed of a thin layer of silver paste fired in place upon a capacitor dielectric 15.

The capacitor dielectric 15 is a thin circular wafer formed preferably of a high K dielectric material such as a titinate. The dielectric 15 with its electrodes 14 provides capacitance in series with the stud 10 and surface 6 to present a resonant circuit as will be described in greater detail. Capacitor dielectric materials such as the titinates are fragile in nature and are subject to rupture under undue mechanical strain. Such strains may arise with dimensional changes of the stud halves 11 in response to temperature change. Since the apparatus of the invention may frequently be subject to wide variations in ambient temperatures, and since the heat evolved within the filter may become considerable, such mechanical strain upon the dielectric 15 may be quite substantial. To reduce the strain upon the dielectric 15 the steel shims 13 are formed of a metal having a temperature coefficient of expansion similar to that of the dielectric material. Radial expansion and contraction of the dielectric 15 may then occur without rupture, and the fingers 12 are sufficiently resilient to move with the steel shims 13 and also to accommodate for longitudinal dimensional change in the stud 10.

The stud 10 is directly secured to the enclosure 1 by means of mounting screws 16, and the resulting anchorage of the stud 10 has inherently high strength so that mechanical vibrations and other shocks will not alter the dimensional relation of the stud 10 to the enclosure 1. A rigidity is inherent which will facilitate maintenance of tuned conditions in the filter. Further the relation of the stud 10 to the enclosure 1 is such that dimensional changes with temperature will not effect the relative physical location of the stud 10 to the other parts of the structure.

The stud 10' is secured in place by set screws 17 shown in FIG. 3. The heads of the screws 17 clampingly engage the edges 18 of circumferentially extending slots 19 cut in opposite sides of the enclosure 1, and the threaded shanks of the screws 17 extend through the slots 19 and the sleeve 3 to enter the stud 10' for threaded engagement therewith. Hence, the stud 10' together with the sleeve 3 may be rotated with respect to the enclosure 1 for adjustment in position with respect to the stud 10, whereby magnetic coupling between resonant circuits of which the studs 10, 10' are a part can be altered for purposes of alignment of the filter.

Each end of the enclosure 1 is closed off by an end cap 20 that mounts a loop antenna 21 to the inside of the enclosure. The right hand cap will be described in detail, and the left hand cap as well as its component parts will be designated by like numerals with the addition of a prime mark. Caps 20, 20' are of like construction.

The end cap 20 has a circumferential flange 22 that has a close sliding fit with the surface 6. Mounted upon the end cap 20 is a coaxial cable connector 23 adapted to join with a conductor, not shown, that supplies or withdraws RF energy from the filter. The connector 23 has a metallic outer sleeve 24 that is integral with a base 25 mounted flush upon the end cap 20. An inner conductor 26 of the connector 23 extends to the interior of the enclosure 1 and is electrically insulated from the sleeve 24 by a non-conductive quill 27. The connector 23 is thus seen to be of standard form, and the inner end of the conductor 26 is electrically connected to one end of the loop antenna 21 mounted on the inside of the cap 20. The opposite end of the loop antenna 21 is directly connected to the cap 20, and as is shown in FIG. 1, the plane of the loop antenna 21 is shown at an angle to the stud 10. This angular relation may be adjusted by rotation of the cap 20 in order to alter the magnetic coupling between the antenna 21 and the circuit of which the stud 10 is a part.

The end cap 20 is held in place by a set of three mounting screws 28 which extend through the enclosure 1 and are in threaded engagement with tapped holes 29 in the flange 22. The end cap 20', at the left hand side of the filter as viewed in FIG. 1, is mounted with the antenna 21' in a position to be magnetically coupled with the stud 10', and mounting screws 30 for the end cap 20' extend through openings 31 in the enclosure 1 and openings 32 in the sleeve 3 for threaded engagement with the flange 22'.

In the apparatus which has been described there is presented a pair of highly reactive resonant circuit elements within the enclosure 1 that are magnetically coupled to one another. The first of these circuit elements comprises the capacitance inserted at the middle of the stud 10 and the inductive current path consisting of the stud 10 and the inner surface 6 of the enclosure 1. This resonant circuit element is seen to be a tank type circuit with lumped capacitance and a single turn inductance. The single turn of inductance commences at the upper electrode 14 of the capacitor and extends through the adjacent steel shim 13 and along the upper stud portion 11 from which it divides and travels circumferentially along the surface 6 downwardly to the lower stud portion 11. The current path then continues upwardly along the stud 10 to the lower capacitor electrode 14. The current flow in the radio frequency ranges for which the invention is intended may be considered a surface current, and accordingly the surface 6 and the stud 10 are highly polished to reduce resistance loss. The stud 10 is plated similarly as the surface 6 to keep this loss at a minimum, and at the intended frequencies the inductive reactance presented by the single turn current path is very large with respect to the resistance, so the Q factor of the resonant circuit element is consequently large. The capacitance introduced in the resonant circuit element by the capacitor dielectric 15 and its electrodes 14 is of such value as to also present a large reactive value at the selected resonant frequency. A single resonant circuit of this form exhibits a low insertion loss when placed in a circuit for a narrow pass band of frequencies. To obtain a wider pass band the circuit is coupled to a second similar circuit.

The second similar resonant circuit element, or circuit, within the enclosure 1 comprises the stud 10' and the surface 7 together with the capacitor dielectric 15'. The current path is similar to that of the circuit of stud 10, and travels diametrically across the interior of the enclosure 1 to divide at the interior surface 7 and extend circumferentially about such surface to return to the opposite end of the diametric current path afforded by the stud 10'.

The conduction currents flowing over the interior surfaces 6, 7 of the enclosure 1 and sleeve 3 are effectively separated from one another by the provision of the slot 5 which acts as a barrier to the longitudinal flow of galvanic currents, and the L shape for the slot 5 enhances its effect as a barrier. The two tuned circuits are therefore effectively isolated with respect to current flow, that is to say, a current component flowing from the stud 10 over the surface 6 will not pass by direct conduction to the surface 7 and through the stud 10′. The circuits, while being isolated in this respect are, however, magnetically coupled. The magnetic field component linking with each circuit is confined by the enclosure 1 and encircles its respective stud 10, 10′. These field components extend longitudinally within the wave guiding enclosure 1 and are orientated by the studs 10, 10′ so as to have a transverse axis. By virtue of having an axis transverse to the enclosure the magnetic field components can be said to be polarized.

The studs 10, 10′ are at an angle to one another to displace the associated polarized magnetic field components at a similar angle, and as shown in FIGS. 1 and 5 the coupling between the tuned circuits is comparatively loose. The relative angle at which the studs 10, 10′ are disposed is adjusted to achieve desired pass band characteristics. In presently contemplated applications a coupling is selected at which a fairly constant low insertion loss value is held over a desired pass band width, and at which the insertion loss to the immediate sides of the pass band rapidly becomes large in value. As a result, for frequencies to the side of the pass band energy transfer through the filter is negligible and at pass band frequencies energy transfer is had with minimal power loss.

The antenna 21, 21′ are magnetically coupled to the studs 10, 10′ respectively for introducing and withdrawing RF energy to and from the high Q resonant circuit elements, and this coupling is carefully adjusted during initial calibration of the filter. The adjustment for the antenna 21, 21′ is both rotational and longitudinal of the enclosure 1. By rotating the end caps 20, 20′ the coupling of the antenna 21, 21′ with the circuits of the studs 10, 10′ is varied and the insertion loss characteristics of the filter can be altered accordingly. A longitudinal movement of an end cap 20, 20′ will shift the frequency response of the filter within limits, so that calibration as to frequency is also available. By moving an end cap 20, 20′ longitudinally the available space for the magnetic field of the adjacent circuit is modified and the inductive property of the resonant circuit is correspondingly altered. With a change in inductance a shift in resonant frequency is obtained. In making the initial adjustments of the end caps 20, 20′ it has been the practice to drill and tap the holes 28, 28′ before inserting the caps 20, 20′ and then drilling the holes 29, 31 and 32 after the positions of the caps 20, 20′ have been determined. Other methods of adjustment and assembly may, of course, be employed.

In FIG. 5 the physical adjustments are schematically illustrated. The stud 10′ is rotated in the orbit 33 for altering the coupling between the highly reactive circuits, and after it is in set position the heads of the mounting screws 17 are brought down tight upon the enclosure 1. The end caps 20, 20′ are shifted inwardly or outwardly as indicated by the arrows 34, and the antenna 21, 21′ are rotated as indicated by the orbital arrows 35. These adjustments are usually in the nature of initial calibration and the assembly as shown does not provide for subsequent tuning. However, if desired, more elaborate construction can be employed to permit frequent adjustment.

In FIGS. 6 through 8 there is shown another embodiment of the invention that is housed within a circular cylindrical wave guiding enclosure 36. The enclosure 36 has a continuous uninterrupted inner surface 37 and enclosing each end of the enclosure 37 is an end cap 38 with an antenna 39 and connector 40, which is like the end caps 20 and 20′ of FIGS. 1–5.

Mounted within the enclosure 36 is a pair of like solid bodies 41 and 42 of dielectric material which act as resonating bodies when subjected to driving fields at the frequencies for which the invention is intended. The bodies 41, 42 are in the form of circular cylinders and the circumferential surface of each is coated with a conductive electrode 43 which is preferably a silver paste fired in place, so as to have an intimate physical engagement. Fitted closely about and soldered to each electrode 43 is a metallic mounting ring 44. The mounting rings 44, in turn, fit snugly within the enclosure 36 so that they bear against the surface 37. The right hand body 42 is held in place by a pair of mounting screws 45 that threadly engage the associated ring 44 and which pass through openings 46 in the enclosure 36. The left hand body 41 is held in place by mounting screws 47, shown in FIG. 7, which extend through circumferential slots 48 in the wall of the enclosure 36. The slots 48 permit the body 41 to be rotated for adjustment of the magnetic coupling between the bodies 41, 42.

Each of the bodies 41, 42 is characterized by a pair of diametric slots 49 which are separated by a remaining web 50 and which subdivide the body into halves. The slots 49 shown in the drawings are circular segments, but they may continue completely through the bodies 41, 42 if desired. It has been found that slots 49 of a configuration as shown in FIG. 6 are satisfactory for the purpose of operation to be described and by maintaining a web 50 between the slots the structural strength is enhanced.

The solid bodies 41, 42 are formed from a material that will exhibit a high Q factor when they are excited by the frequencies at which internal resonance occurs. The titinates are satisfactory materials for this purpose. These materials are known as high dielectric constant materials and for the purposes of this invention a titinate is selected that will maintain a stable resonant frequency through a wide range of temperature. At present the titinates of lower dielectric constant values satisfy this requirement. Wave lengths are considerably shortened in the high dielectric constant (high K) materials, so that at radio frequencies a body of small overall dimensions will act as a resonant circuit element when properly related to fields of excitation. In the present invention such a field of excitation is presented by one of the antenna 39. The resonant frequency is determined by physical dimensions and dielectric constant of the body, and hence by proper selection of these criteria a resonant circuit element is had for a desired narrow band of frequencies. This circuit element is then utilized like the tank type circuits of FIGS. 1–5. The solid body resonators of FIGS. 6–8 have distributed circuit parameters and are similar to cavity resonators in operation. Out of phase magnetic and electric fields within the body reinforce one another so that with small internal losses resonant operation can be secured with a high Q factor.

The mode of resonance for the bodies 41, 42 is determined by the application of the metallic electrodes 43, which present zero impedance boundaries extending circumferentially about the bodies. The electrodes 43 act to carry conduction currents along the interface with the dielectric and in this form of the invention the electromagnetic resonance is confined to the dielectric bodies, wherefore there is no need for a slot 5 as shown in the form of the invention of FIGS. 1–5. The end faces of the dielectric bodies 41, 42 are infinite impedance boundaries through which magnetic fields may pass, thus allowing for excitation from an antenna and for coupling between bodies 41, 42. To provide a polarizing, or directional, effect for the magnetic fields the slots 49 are cut in the bodies 41, 42. Displacement currents in the bodies 41, 42 are thereby aligned, and are caused to parallel the slots 49 at the center of the bodies 41, 42. The associated magnetic fields then link with the diametric axis of the slots 49, to have an orientation like the fields had in the apparatus of FIGS. 1–5. Hence, the invention, in its several forms, provides a wave guiding enclosure with spaced resonant circuit elements therein having polarized magnetic fields whereby rotation of a resonator affects coupling therebetween.

In the apparatus of FIGS. 6–8 adjustment of the coupling between resonators is had by loosening set screws 47 to permit physical rotation of the body 41. Further adjustment is obtained by movement of the antenna 39 and end caps 38. The band pass characteristic can thereby be shaped within limits, and by use of a dielectric of high Q factor a very discriminating tuned filter may be achieved in which a narrow pass band of frequency is characterized by steep side slopes.

The configuration of the dielectric bodies may be altered from that shown in FIGS. 6–8. For example, in FIG. 9 there is shown a body 51 that has substantially rectangular end faces. The slots 49 of FIGS. 6–8 are eliminated and the rectangular configuration will orientate displacement currents and associated magnetic fields so that a polarized effect is maintained. The opposite ends 52 of the body 51 are coated with a silver paste, and the galvanic current path is completed by polished surfaces 53 of the ring 54. The form of resonant circuit element shown in FIG. 9 is a hybrid between the tank circuit of FIGS. 1–5 and the complete resonant bodies of FIGS. 6–8, and by further reduction of length and width of the dielectric body 51 other hybrid forms may be arrived at.

The cross section dimension of the wave guiding enclosures 1, 36 are selected to have a cut-off frequency greater than the frequencies that constitute the narrow pass band of the filter. The wave guiding enclosures are operated below cut-off frequency, and under such condition a very effective filter is achieved having a narrow pass band and high insertion loss at frequencies to both sides of the pass band. It is contemplated that for the lower ranges of frequencies the construction of FIGS. 1–5 will be utilized, and in actual practice frequencies of 200 to 300 mc.p.s. have been used in a filter that is four inches long and one and one-half inches wide. This filter handles about fifty watts. For greater frequencies ranging beyond 1000 mc.p.s. the use of resonant dielectric bodies may be of more particular advantage.

We claim:

1. In a narrow band pass filter for radio frequencies the combination comprising: a tubular metallic enclosure for confining magnetic fields therein; a pair of longitudinally spaced resonant circuit elements in said enclosure each adapted to have strong magnetic fields associated therewith at resonance, each circuit element having a conductive stud extending transversely across the interior of the enclosure which connects at its opposite ends with the enclosure and having a capacitor interposed in the stud to thereby form an inductive-capacitive circuit comprising an inductive loop extending through the stud and circumferentially about the inner surface of the enclosure and a capacitance in series with the inductive loop whereby the field of each circuit element encircles an axis transverse of the enclosure such that rotation of a circuit element adjusts the coupling between elements; a circumferential division in the inner surface of the enclosure which longitudinally divides the resonant circuit elements one from another; and means for introducing radio frequency energy to said circuit elements and withdrawing energy therefrom.

2. In a narrow band pass filter for radio frequencies the combination comprising: a tubular metallic wave guiding enclosure with axially movable transverse end walls that has a crosswise dimension that establishes a cut-off frequency for such a wave guide which is greater than frequencies to be passed by the filter; a pair of longitudinally spaced resonant circuit elements extending across the interior of said enclosure and connecting with the opposite sides of the enclosure to complete a circuit therewith, each tuned to resonate through a narrow band of frequencies below said cut-off frequency, the associated magnetic field of each circuit element encircling a line extending crosswise of the enclosure whereby a relative rotation about a longitudinal axis of the enclosure adjusts the coupling between the circuit elements; a circumferential interruption about the inner wall of the enclosure at a point between said circuit elements; and antenna means at each end wall for introducing radio frequency energy to said circuit elements and withdrawing energy therefrom.

3. In a narrow band pass filter for radio frequencies the combination comprising: a tubular metallic enclosure; a first circuit element within said enclosure adapted to resonate in a pre-selected frequency band, which circuit element has a conduction current path extending circumferentially about the inner wall of the enclosure and current path means extending across the interior of the enclosure from one side to the other to complete a circuit with the circumferential path and to orientate the magnetic field of the circuit element in encircling relation to a line from one side of the enclosure to the other; a second circuit element within said enclosure adapted to resonate in said pre-selected frequency band and to be magnetically coupled to said first circuit element, which second circuit element has a conduction current path extending circumferentially about the inner wall of the enclosure and current path means extending across the interior of the enclosure from one side to the other to complete a circuit with the circumferential path and to orientate the magnetic field of the circuit element in encircling relation to a line from one side of the enclosure to the other; and an antenna at each end of the enclosure each coupled to one of said circuit elements.

4. In a narrow band pass filter for radio frequencies the combination comprising: a wave confining tubular enclosure; a pair of longitudinally spaced electrically conducting paths each extending circumferentially about the inside wall of the enclosure; a pair of central current paths each joining with one of said circumferential conducting paths to extend diametrically across the interior of the enclosure from one side of the associated circumferential conducting path to the opposite side, such current paths each including a dielectric to present a capacitive component, whereby each combination of central current path and circumferential conducting path presents a circuit in magnetically coupled relation to the other combination of a central current path and a circumferential conducting path; and a pair of antenna each coupled to one of said tuned circuits for introducing and withdrawing RF energy to and from said tuned circuits.

5. In a narrow band pass filter for radio frequencies the combination comprising: a metallic tubular enclosure having a circumferential slot extending about the inner surface thereof, which slot includes a longitudinal cutback leaving an overhanging lip in the wall of the enclosure thereby forming an electrical division between longitudinally spaced circumferential conducting paths; a pair of conductor studs within said enclosure each connected at its ends with one of said circumferential conducting paths and extending between opposite sides thereof to provide a current loop that will have magnetic fields extending longitudinally within said enclosure; a capacitor inserted in each conductor stud to introduce capacitance into each current loop to provide a pair of tuned circuits magnetically coupled with one another; and means for introducing and withdrawing RF energy to and from said tuned circuits.

6. In a narrow band pass filter for radio frequencies the combination comprising: a metallic tubular enclosure; a tubular sleeve fitted within and rotatable with respect to said enclosure which forms with the enclosure a circumferential slot extending about the inner wall thereof to thereby interrupt longitudinal current flow and to divide the inner surface areas of the enclosure and sleeve into a pair of longitudinally spaced circumferential conducting paths; a pair of diametrically extending conductor studs within said enclosure each connected at its ends with one of said circumferential conducting paths to provide a current loop that will have magnetic fields extending longitudinally within said enclosure; a capacitor inserted in each conductor stud to introduce capacitance into each current loop and thereby provide a pair of tuned circuits magnetically coupled with one another; and means for introducing and withdrawing RF energy to and from said tuned circuits.

7. In a narrow band pass filter for radio frequencies the combination comprising: a metallic tubular wave guiding enclosure having a crosswise dimension providing for a cut-off frequency for the wave guiding enclosure which is greater than frequencies to be passed by the filter; a pair of longitudinally spaced crosswise extending conductor studs within said enclosure each connected at its ends with opposite sides of the interior surface of the enclosure to provide current loops that will have magnetic fields extending longitudinally within said enclosure; a capacitor inserted in each conductor stud to introduce capacitance into each current loop to provide a pair of tuned circuits magnetically coupled with one another; and means for introducing and withdrawing RF energy to and from said tuned circuits.

8. A filter in accordance with claim 7 in which each capacitor comprises a dielectric of high K material and thin electrodes in intimate contact therewith, and in which a metal insert is placed between each electrode and the adjacent stud which has a temperature coefficient of expansion similar to that of the dielectric material.

9. A filter in accordance with claim 7 in which said means for introducing and withdrawing RF energy comprise a pair of antenna secured to opposite end walls of the enclosure, each antenna being movable with its associated end wall longitudinally of the enclosure to adjust the frequency of the filter.

10. In a narrow band pass filter for radio frequencies the combination comprising: a tubular metallic enclosure; a first body of dielectric material in said enclosure having a metallized circumferential surface extending closely about the inner surface of said enclosure, bare end faces through which magnetic fields may extend, and a slot in the dielectric material extending crosswise of the enclosure that sub-divides the dielectric along a line extending from one side to the other of the enclosure; a second body of dielectric material in said enclosure longitudinally spaced from said first body which has a metallized circumferential surface extending closely about the inner surface of said enclosure, bare end faces through which magnetic fields may extend, and a slot in the dielectric material extending crosswise of the enclosure that subdivides the dielectric along a line running from one side to the other of the enclosure; and means at the ends of the enclosure that are electromagnetically coupled with the said dielectric bodies for introducing and withdrawing energy at radio frequencies.

11. In a narrow band pass filter for radio frequencies the combination comprising: a tubular metallic enclosure; a first resonant body of dielectric material in said enclosure having a metallized circumferential surface extending closely about the inner surface of said enclosure, exposed end faces facing longitudinally of the enclosure, and a transverse slot that subdivides the dielectric whereby magnetic fields had when the body is in resonance extend from the end faces and encircle a line transverse of the enclosure; and a second resonant body of dielectric material in said enclosure longitudinally spaced from said first body which has a metallized circumferential surface extending closely about the inner surface of said enclosure, exposed end faces facing longitudinally of the enclosure, and a transverse slot that subdivides the dielectric whereby magnetic fields had when the body is in resonance extend from the end faces and encircle a line transverse of the enclosure; said resonant bodies being magnetically coupled when in resonance.

12. A filter in accordance with claim 11 in which the dielectric bodies are relatively rotatable to adjust coupling therebetween.

13. In a narrow band pass filter for radio frequencies the combination comprising: a tubular metallic wave guiding enclosure having a crosswise dimension providing a cut-off frequency greater than those to be passed by the filter; a first body of dielectric material in said enclosure having a metallized circumferential surface extending closely about the inner surface of said enclosure, exposed end faces through which magnetic fields may extend, and a crosswise extending slot that subdivides the dielectric, which body provides a first resonator with resonant frequency below said cut-off frequency; a second body of dielectric material in said enclosure longitudinally spaced from said first body which has a metallized circumferential surface extending closely about the inner surface of said enclosure, exposed end faces through which magnetic fields may extend, and a crosswise extending slot that subdivides the dielectric; and means magnetically coupled with said dielectric bodies for introducing and withdrawing energy at radio frequencies.

14. In a narrow band pass filter for radio frequencies the combination comprising: a tubular metallic enclosure having a crosswise dimension providing a cut-off frequency therefor; a first resonant body of dielectric material in said enclosure having longitudinally facing end faces through which magnetic fields may extend, and a transverse slot that subdivides the dielectric, said body being resonant below said cut-off frequency; and a second resonant body of dielectric material in said enclosure longitudinally spaced from said first body which also has end faces through which magnetic fields may extend, a transverse slot that subdivides the dielectric, and a resonant frequency below said cut-off frequency.

15. In a narrow band pass filter for radio frequencies the combination comprising: a tubular metallic enclosure; a pair of bodies of dielectric material in said enclosure each having a lengthwise dimension greater than a crosswise dimension and being disposed with the lengthwise dimension extending crosswise of the enclosure, said bodies being longitudinally spaced to present resonant circuit elements with polarized magnetic fields coupled to one another; and means for introducing and withdrawing RF energy to and from the circuit elements.

16. In a narrow band pass filter for radio frequencies the combination comprising: a tubular metallic enclosure for confining magnetic fields therein; a pair of longitudinally spaced resonant circuit elements in said enclosure each adapted to have strong magnetic fields associated therewith at resonance, each circuit element comprising a dielectric body with a metal coating extending circumferentially about the same that is close to the inner wall of the enclosure, such body having a slot therein extending crosswise and longitudinally of the enclosure whereby the field of each circuit element encircles an axis transverse of the enclosure such that rotation of a circuit element adjusts the coupling between elements; and means for introducing radio frequency energy to said circuit elements and withdrawing energy therefrom.

References Cited in the file of this patent

UNITED STATES PATENTS

| | | |
|---|---|---|
| 2,028,534 | Crossley | Jan. 21, 1936 |
| 2,082,589 | Neighbors | June 1, 1937 |
| 2,206,096 | Klotz | July 2, 1940 |
| 2,432,093 | Fox | Dec. 9, 1947 |
| 2,443,612 | Fox | June 22, 1948 |
| 2,541,375 | Mumford | Feb. 13, 1951 |
| 2,603,754 | Hansen | July 15, 1952 |
| 2,950,452 | Marcatili | Aug. 23, 1960 |